United States Patent [19]

Furumoto et al.

[11] Patent Number: 4,922,717
[45] Date of Patent: May 8, 1990

[54] HYDRAULICALLY OPERATED CONTINUOUSLY VARIABLE TRANSMISSION

[75] Inventors: Mistumasa Furumoto, Kawagoe; Eiichiro Kawahara; Kenichi Ikejiri, both of Saitama, all of Japan

[73] Assignee: Honda Giken Kogyo Kabushiki Kaisha, Tokyo, Japan

[21] Appl. No.: 100,245

[22] Filed: Sep. 23, 1987

[30] Foreign Application Priority Data

Sep. 26, 1986 [JP] Japan ................................ 61-227418

[51] Int. Cl.⁵ ............................................. F16D 31/02
[52] U.S. Cl. ....................................... 60/456; 60/488; 60/489
[58] Field of Search ................... 60/487, 488, 489–492, 60/325, 456, 464

[56] References Cited

U.S. PATENT DOCUMENTS

| | | |
|---|---|---|
| 2,777,286 | 1/1957 | Badalini . |
| 3,364,680 | 1/1968 | Osojnak ................................ 60/489 |
| 3,449,912 | 6/1969 | Dunikowski . |
| 3,464,206 | 9/1969 | Badalini ................................ 60/456 |
| 3,508,401 | 4/1970 | Aplin ................................ 60/489 X |
| 3,555,817 | 1/1971 | Hann . |
| 3,907,043 | 9/1975 | Appleman ........................ 60/487 X |
| 3,999,387 | 12/1976 | Knopf ................................ 60/488 X |
| 4,087,969 | 5/1978 | Takahashi . |
| 4,274,505 | 6/1981 | Maust ................................ 60/487 X |
| 4,444,093 | 4/1984 | Koga . |
| 4,478,134 | 10/1984 | Kawahara . |
| 4,548,036 | 10/1985 | Matsuda . |
| 4,646,520 | 3/1987 | Furumoto . |

FOREIGN PATENT DOCUMENTS

| | | |
|---|---|---|
| 46-11852 | 3/1971 | Japan . |
| 57-70968 | 5/1982 | Japan . |
| 57-76357 | 5/1982 | Japan . |
| 59-38467 | 9/1984 | Japan . |
| 473997 | 6/1969 | Switzerland . |

Primary Examiner—Edward K. Look
Attorney, Agent, or Firm—Lyon & Lyon

[57] ABSTRACT

A continuously variable transmission employing a hydraulic motor and a hydraulic pump that are interconnected by a closed hydraulic circuit. An oil chamber is defined between the pump cylinder of the hydraulic pump and the motor cylinder of the hydraulic motor. A common oil cooling unit is connected through oil passages to the closed hydraulic circuit and the oil chamber for cooling heated oil supplied therefrom. The common oil cooling unit effectively cools the oil from the two sources since the heat developed in the oil from the two sources generally varies inversely during different modes of operation.

12 Claims, 5 Drawing Sheets

4,922,717

HYDRAULICALLY OPERATED CONTINUOUSLY VARIABLE TRANSMISSION

BACKGROUND OF THE INVENTION

The present invention relates to a hydraulically operated continuously variable transmission, and more particularly to a hydraulically operated continuously variable transmission having a single oil cooling unit for dissipating the heat generated by the various sliding surfaces in the transmission.

Hydraulically operated continuously variable transmissions are known in the art as disclosed in Japanese Laid-Open Patent Publication No. 57-76357, for example.

Such hydraulically operated continuously variable transmissions have various members or locations which generate heat due to power loss. These heat-generating members may be associated with respective oil cooling units for cooling oil that has absorbed generated heat.

The hydraulically operated continuously variable transmission has a hyraulic motor including a motor cylinder, a hydraulic pump including a pump cylinder and a pump swash plate rotatable with the motor cylinder, a distribution ring, and a distribution member slidably held against the distribution ring. Since pump swash plate rotates with the motor cylinder, the amount of heat generated by the hydraulic pump is greater as the differential rotational speed between the pump cylinder and the motor cylinder is higher, i.e., the output rotational speed of the transmission is lower. The amount of heat produced by the sliding surfaces of the distribution ring and the distribution member is high as the output rotational speed is relatively high because the rotational speed of the distribution member is in proportion to the output rotational speed.

Therefore, the maximum heat generated by the sliding surfaces in the hydraulic pump and the maximum heat generated by the sliding surfaces of the distribution ring and the distribution member are not produced at the same time, and therefore could be dissipated by a single oil cooling unit.

SUMMARY OF THE INVENTION

It is an object of the present invention to provide a hydraulically operated continuously variable transmission including a single oil cooling unit for dissipating the heat generated by the sliding surfaces in a hydraulic pump and the heat generated by the sliding surfaces of a distribution ring and a distribution member, so that the oil cooling unit can be of a small size and increased cooling efficiency may be achieved.

According to the present invention, there is provided a hydraulically operated continuously variable transmission including a hydraulic motor coupled to an output shaft and having a motor swash plate and a motor cylinder supporting an annular array of slidable motor plungers held in slidable contact with the motor swash plate, the motor cylinder having a distribution member, a hydraulic pump coupled to an input shaft and having a pump swash plate and a pump cylinder held slidably against the distribution member and supporting an annular array of slidable pump plungers held in slidable contact with the pump swash plate, the pump cylinder and the motor cylinder communicating with each other through the distribution member, a closed hydraulic circuit interconnecting the hydraulic pump and the hydraulic motor, a distribution ring held slidably against the distribution member and dividing the closed hydraulic circuit into lower- and higher-pressure sides, an oil chamber defined between the pump cylinder and the motor cylinder, first oil passage means communicatintg with the oil chamber, second oil passage means commúnicating with the closed hydraulic circuit, and a common oil cooling unit to which the first and second oil passage means are connected.

When the rotational speed of the output shaft is low, the heat generated by the sliding surfaces of the hydraulic pump is the main source of heat dissipated by the oil cooling unit, and when the rotational speed of the output shaft is low, the heat generated by the sliding surfaces of the distribution member and the distribution ring is the main source of heat dissipated by the oil cooling unit.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
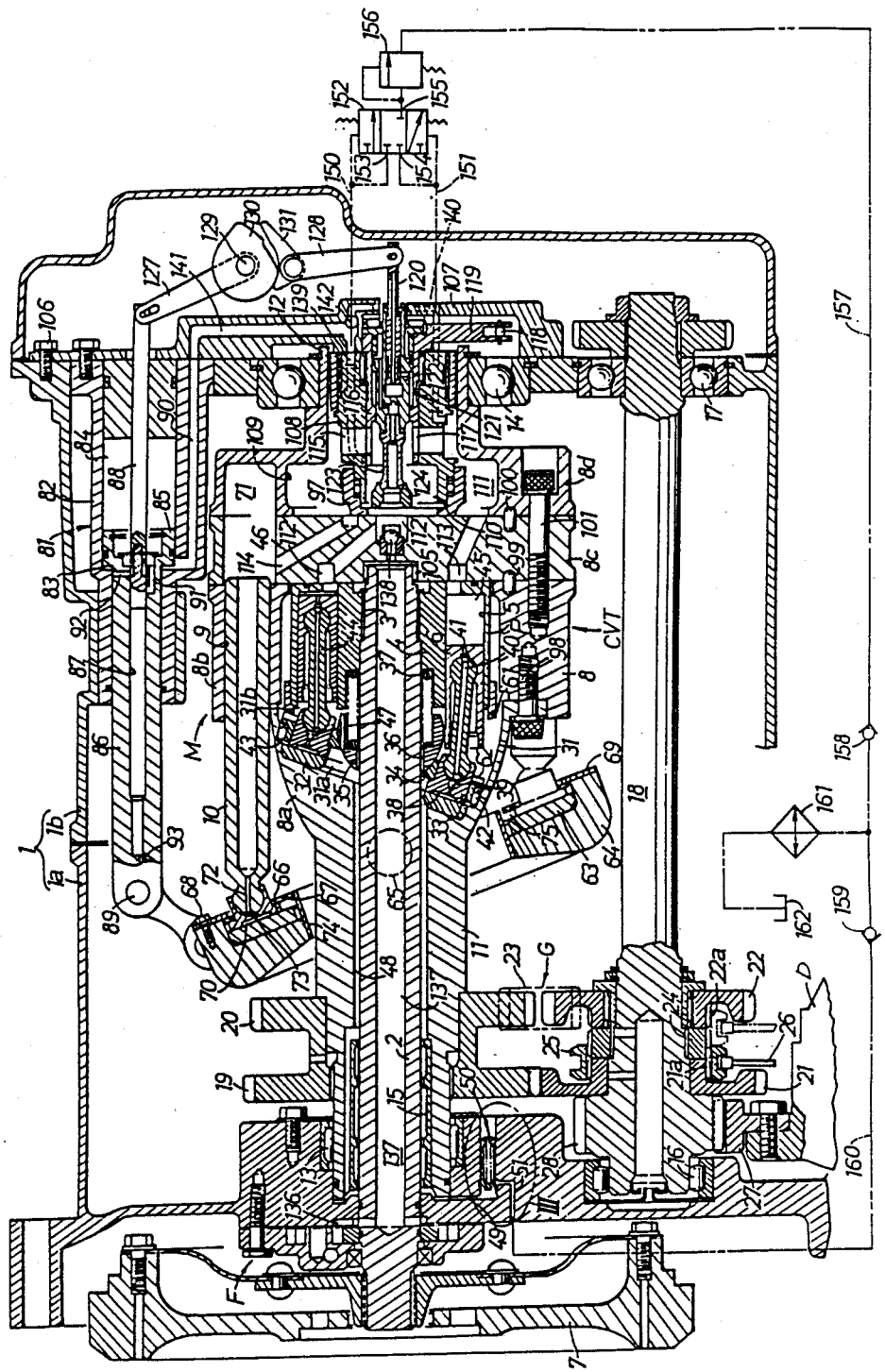
FIG. 1 is a longitudinal cross-sectional view of an automotive hydraulically operated, continuously variable transmission according to an embodiment of the present invention.

Like or corresponding parts are denoted by like or corresponding reference numerals throughout several views.

FIG. 1 shows a hydraulically operated, continuously variable transmission CVT according to the present invention for use on a motor vehicle such as an automobile, the transmission CVT basically comprising a hydraulic pump P of fixed displacement and a hydraulic motor M of variable displacement which are coupled in a closed hydraulic circuit and housed in a transmission case 1 composed of a pair of longitudinally separate case members 1a, 1b.

The hydraulic pump P has a pump cylinder 4 splined at 3 to an input shaft 2, a plurality of cylinder holes or bores 5 defined in the pump cylinder 4 in a circular pattern around the input shaft 2, and a plurality of pump plungers 6 slidably fitted respectively in the cylinder holes 5. The power of an engine (not shown) is transmitted through a flywheel 7 coupled to the input shaft 2.

The hydraulic motor M has a motor cylinder 8 disposed concentrically in surrounding relation to the pump cylinder 4 and rotatable relatively thereto, a plurality of cylinder holes or bores 9 defined in the motor cylinder 8 in a circular pattern around the center of rotation thereof, and a plurality of motor plungers 10 slidably fitted respectively in the cylinder holes 9.

The motor cylinder 8 has axially opposite ends on which a pair of support shafts 11, 12 are disposed, respectively. The support shaft 11 is rotatably supported on the axial end wall of the case member 1a by means of a needle bearing 13, and the support shaft 12 is rotatably supported on the axial end wall of the case member 1b by means of a ball bearing 14.

The input shaft 2 extends through the end wall of the case member 1a in a fluid-tight manner, and is disposed concentrically in the support shaft 11. A plurality of needle bearings 15 are disposed between the inner surface of the support shaft 11 and the outer surface of the input shaft 2, so that the input shaft 2 and the pump cylinder 4, and the support shaft 11 and the motor cylinder 8 are relatively rotatable.

The support shaft 11 serves as the output shaft of the hydraulic motor M. Parallel to the support shaft 11, there is provided an auxiliary shaft 18 rotatable supported on the opposite end walls of the transmission case 1 by roller bearings 16, 17. A forward/reverse gear assembly G is located between the auxiliary shaft 18 and the support shaft 11.

The forward/reverse gear assembly G comprises a pair of driver gears 19, 20 fixedly mounted on the support shaft 11, a driven gear 21 rotatably supported on the auxiliary shaft 18 in mesh with one of the driver gears 19, a driven gear 22 rotatably supported on the auxiliary shaft 18 in radial alignment with the other driver gear 20, an intermediate gear 23 meshing with the driver gear 20 and the driven gear 22, a driven clutch gear 24 fixed to the auxiliary shaft 18 between driver clutch gears 21a, 22a integral with the opposite surfaces of the driven gears 21, 22, and a clutch member 25 for selectively coupling the driver clutch gears 21a, 22a to the driven clutch gear 24. A shift fork 26 engages in the clutch member 25 for selectively moving the same axially into engagement with the driver clutch gear 21a and the driven clutch gear 24 or the driver clutch gear 22a and the driven clutch gear 24.

The auxiliary shaft 18 has an integral gear 28 held in mesh with an input gear 27 of a differential D. In response to operation of the clutch member 25, the differential D is operated selectively in forward and reverse directions of the motor vehicle.

Figure 2:
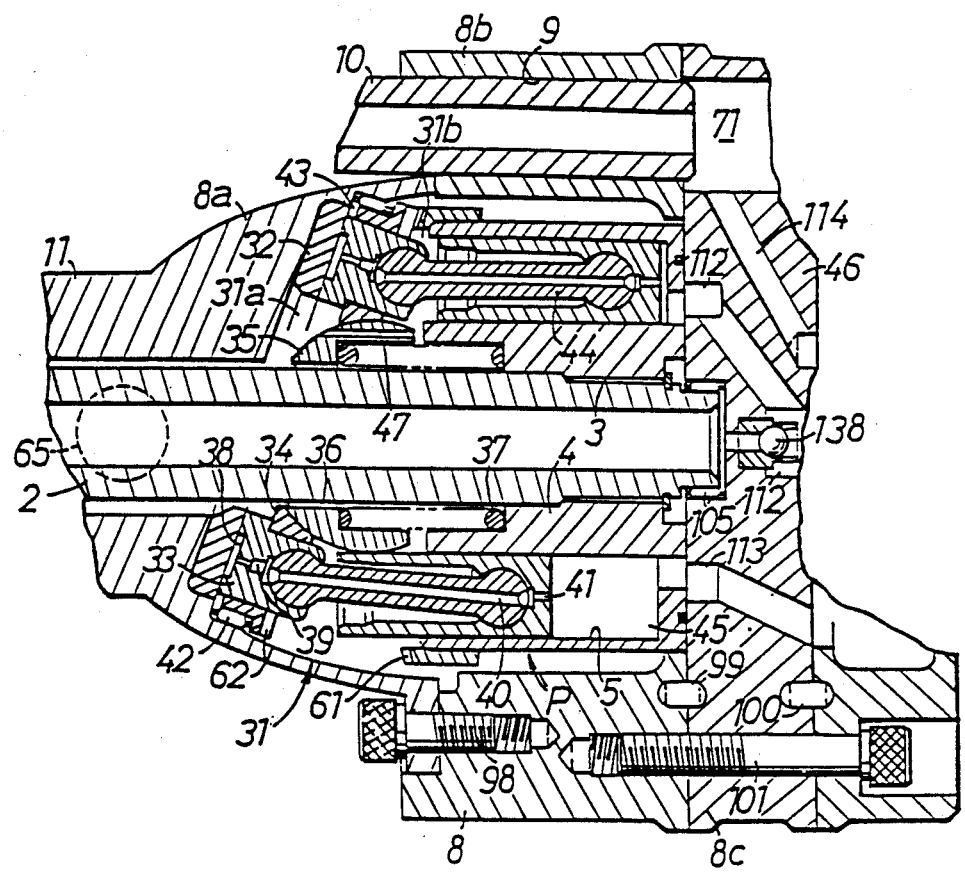
FIG. 2 is an enlarged fragmentary cross-sectional view of a hydraulic pump and a hydraulic motor in the automotive hydraulically operated continuously variable transmission shown in FIG. 1.

As shown in FIG. 2, a hydraulically hermetic chamber 31 is defined between the motor cylinder 8 and the pump cylinder 4, and a pump swash plate 32 supported in the chamber 31 inwardly of the motor cylinder 8 and facing the end face of the pump cylinder 4. An annular unitary pump shoe 33 is held in slidable contact with the pump swash plate 32.

The pump plungers 6 and the pump shoe 33 are relatively swingably coupled by connecting rods 44. A presser ring 34 supported on the motor cylinder 8 by a roller bearing 42 is held against an inner peripheral step of the pump shoe 33. A spring holder 35 is held against the presser ring 34, the spring holder 35 being coupled to the input shaft 2 through splines 36 which allow axial movement of the spring holder 35 on the input shaft 2 but prevents rotation of the spring holder 35 relatively to the input shaft 2. A coil spring 37 is disposed around the input shaft 2 between the spring holder 35 and the pump cylinder 4 for normally pressing the spring holder 35 to cause the presser ring 34 to push the pump shoe 33 resiliently toward the pump swash plate 32. The spring holder 35 has a partly spherical surface contacting a complementary partly spherical surface of the presser ring 34. Therefore, the spring holder 35 is neatly held against the presser ring 34 for transmitting the resilient force from the spring 37 to the presser ring 34.

The chamber 31 is divided into a first chamber 31a near the pump swash plate 32 and a second chamber 31b near the pump cylinder 4 by the pump shoe 33, the presser ring 34, and the spring holder 35.

The pump swash plate 32 and the pump shoe 33 have mutually sliding surfaces with their inner peripheral edges facing into the first chamber 31a, so that lubricating oil leaking from these sliding surfaces flow into the first chamber 31a. To lubricate the sliding surfaces of the pump swash plate 32 and the pump shoe 33, an annular hydrauilc pocket 38 is defined in the front surface of the pump shoe 33 and communicates through oil holes 39, 40, 41 defined in the pump shoe 33, the connecting rods 44, and the pump plungers 6 with pump chambers 45 defined between the pump plungers 6 and the pump cylinder 4. Therefore, oil under pressure in the pump chambers 45 is supplied through the oil holes 41, 40, 39 to the hydraulic pocket 38 for thereby lubricaing the sliding surfaces of the pump shoe 33 and the pump swash plate 32. At the same time, oil pressure in the hydraulic pocket 38 is applied to the pump shoe 33 to bear the projecting thrust of the pump plungers 6, so that the pressure of contact between the pump shoe 33 and the pump swash plate 32 can be reduced.

An annular lubricating chamber 43 is defined around the sliding surfaces of the pump swash plate 32 and the pump shoe 33 by means of the motor cylinder 8, the pump swash plate 32, the pump shoe 33, and a roller bearing 42, the lubricating chamber 43 being part of the second chamber 31b.

Oil under pressure in the hydraulic pocket 38 leaks along the sliding surfaces of the pump shoe 33 and the pump swash plate 32 at all times. The oil that has thus leaked first fills the lubricating chamber 43 as lubricating oil, and then leaks into the second chamber 31b through the roller bearing 42. Therefore, the lubricating chamber 43 is always replenished with new lubricating oil which can reliably lubricate the sliding surfaces of the pump shoe 33 and the pump swash plate 32 even from outside of the pump shoe 33.

Into the second chamber 31b, there flows oil from the lubricating chamber 43 and also lubricating oil from the sliding surfaces of the pump plungers 6 and the cylinder holes 5 and the sliding surfaces of the pump cylinder 4 and a distribution member 46.

The spring holder 35 has a passage 47 by which the first and second chambers 31a, 31b are held in communication with each other. Between the support shaft 11 and the input shaft 2, there is defined a first discharge passage 48 communicating with the first chamber 31a and coupled through a second discharge passage 49 and a pressure control valve 50 to a third discharge passage 51.

Figure 3:
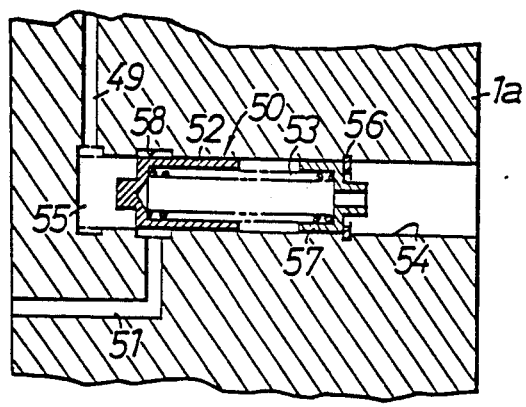
FIG. 3 is an enlarged fragmentary cross-sectional view of an encircled area indicated by III in FIG. 1.

As shown in FIG. 3, the pressure control valve 50 comprises a bottomed cylindrical spool valve body 52 for allowing and cutting off fluid communication between the second and third discharge passages 49, 51, and a spring 53 for normally urging the spool valve body 52 in a direction to cut off such fluid communication. The end wall of the case member 1a of the transmission case 1 has a bottomed hole 54 parallel to the input shaft 2. The spool valve body 52 is slidably fitted in the bottomed hole 54, defining an oil chamber 55 between the bottom of the hole 54 and the spool valve body 52. A support member 57 is also inserted in the bottomed hole 54, the support member 57 being prevented from moving toward the open end of the bottomed hole 54 by means of a retaining ring 56 fitted in the bottomed hole 54. A spring 53 is disposed between the support member 57 and the spool valve body 52. The spool valve body 57 is therefore caused to slide in the bottom hole 54 until the hydraulic pressure in the oil chamber 55 which tends to open the pressure control valve 50 and the spring force of the spring 53 which tends to close the pressure control valve 50 are counterbalanced.

The oil chamber 55 is held in communication with the second discharge passage 49 which is defined in the end wall of the case member 1a. An annular groove 58 is defined in an inner peripheral surface of the bottomed hole 54 and held in communication with the third discharge passage 51. The annular groove 58 is selectively brought into and out of communication with the oil chamber 55 by the spool valve body 52.

Therefore, when the oil pressure in the oil chamber 55, i.e., the chamber 31, exceeds a level set by the spring 53, the pressure control valve 50 is opened to adjust the oil pressure in the chamber 31 to a prescribed level.

Intermeshing bevel gears 61, 62 are fixed respectively to the confronting ends of the pump cylinder 4 and the pump shoe 33. The bevel gears 61, 62 are synchronous gears having the same number of teeth. When the pump cylinder 4 is rotated by the input shaft 2, the pump shoe 33 is synchronously rotated through the bevel gears 61, 62. On rotation of the pump shoe 33, those pump plungers 6 which run along an ascending side of the inclined surface of the pump swash plate 32 are moved in a discharge stroke by the pump swash plate 32, the pump shoe 33, and the connecting rods 44, and those pump plungers 6 which travel along a descending side of the inclined surface of the pump swash plate 32 are moved in a suction stroke.

In the hydraulic motor M, an annular motor swash plate 63 confronting the motor cylinder 8 is fitted in an annular swash plate holder 64. The swash plate holder 64 has a pair of integral trunnions 65 projecting outwardly from its opposite sides and pivotally supported in the transmission case 1. Therefore, the motor swash plate 63 can be tilted together with the swash plate holder 64 about the axis of the trunnions 65.

The tip ends of the respective motor plungers 10 are relatively swingably coupled to a plurality of motor shoes 66 held in slidable contact with the motor swash plate 63. To keep the respective motor shoes 66 in slidable contact with the motor swash plate 63, a presser plate 67 which holds the backs of the motor shoes 66 is rotatably supported by a ring 69 fastened to the swash plate holder 64 by means of bolts 68. The motor shoes 66 and the motor plungers 10 where they are coupled project through the presser plate 67 at a plurality of circumferentially spaced positions. The presser plate 67 is therefore rotatable with the motor shoes 66.

Each of the motor shoes 66 has a hydraulic pocket 70 defined in its front face slidably contacting the motor swash plate 63. Oil chambers 71 defined between the closed ends of the cylinder holes 9 and the respective motor plungers 10 communicate with the corresponding hydraulic pockets 70 through joined oil holes 72, 73 defined in the motor plungers 10 and the motor shoes 66. Therefore, oil under pressure in the oil chambers 71 is supplied through the oil holes 72, 73 into the hydraulic pockets 70 to apply a pressure to the motor shoes 66 for bearing the projecting thrust of the motor plungers 10. The pressure thus applied to the motor shoes 66 reduces the pressure of contact between the motor shoes 66 and the motor swash plate 63, and causes oil to lubricate the sliding surfaces of the motor shoes 66 and the motor swash plate 63.

A cylindrical partition 74 is fitted against the inner peripheral surface of the swash plate holder 64 in confronting relation to the inner peripheral surface of a presser plate 67 with a small gap therebetween. The partition 74, the swash plate holder 64, and the presser plate 67 jointly define a lubricating chamber 75 accommodating the sliding surfaces of the motor shoes 66 and the motor swash plate 63.

Oil under pressure in the respective hydraulic pockets 70 leaks along the sliding surfaces of the motor shoes 66 and the motor swash plate 63 at all times. The oil that has thus leaked first fills the lubricating chamber 75 as lubricating oil, and then leaks out through the gap around the presser plate 67. Therefore, the lubricating chamber 75 is always replenished with new lubricating oil which can reliably lubricate the sliding surfaces of the motor shoes 66 and the motor swash plate 63 even from outside of the motor shoes 66.

If the pressure in the lubricating chamber 75 approached the pressure in the hydraulic pockets 70, the ability of the hydraulic pockets 70 to hydraulically support the motor shoes 66 would be impaired. To prevent this, the gap around the presser plate 67 is suitably selected dependent on the amount of oil leakage from the hydraulic pockets 70 so that the lubricating chamber 75 will hold oil under an approximately atmospheric pressure condition.

A servomotor 81 for tilting the swash plate holder 64, i.e., the motor swash plate 38 is disposed in the transmission case 1. The servomotor 81 comprises a servo cylinder 82 fixed to the transmission case 1, a servo piston 85 slidably disposed in the servo cylinder 82 and dividing the interior space of the servo cylinder 82 into a lefthand oil chamber 83 and a righthand oil chamber 84, a piston rod 86 integral with the servo piston 85 and movably extending through the end wall of the servo cylinder 82 near the lefthand oil chamber 83 in a fluid-tight manner, and a rod-shaped pilot valve 88 having an end slidably fitted in a valve hole 87 defined in the servo piston 85 and the piston rod 86 and movably extending through the end of the servo cylinder 82 near the righthand oil chamber 84 in a fluid-tight manner.

The piston rod 86 is coupled to the swash plate holder 64 by a pin 89. An oil passage 90 defined in the servo cylinder 82 is held in communication with the lefthand oil chamber 83 for supplying oil pressure to act on the servo piston 85. The servo piston 85 and the piston rod 86 have a passage 91 for bringing the righthand oil chamber 84 into communication with the valve hole 87 in response to rightward movement of the pilot valve 88, and a passage 92 for bringing the righthand oil chamber 84 into communication with the lefthand oil chamber 83 in response to leftward movement of the pilot valve 88. The valve hole 87 communicates with a oil tank at the bottom of the transmission case 1 through a return passage 93.

The servo piston 85 is operated in amplified movement by following the lefthand and righthand movement of the pilot valve 88 under the oil pressure from the oil passage 90. In response to movement of the servo piston 85, the swash plate holder 64, i.e., the motor swash plate 63 can be angularly shifted or adjusted between the most inclined position (as shown) and the right-angle position where the motor swash plate 63 lies perpendicularly to the motor plungers 10. Upon rotation of the motor cylinder 3, the motor swash plate 63 reciprocally moves the motor plungers 10 into and out of the cylinder holes 9. The stroke of the motor plungers 10 can continuously be adjusted by the inclination of the motor swash plate 63.

A closed hydraulic circuit is formed between the hyraulic pump P and the hydraulic motor M through the distribution member 46 and a distribution ring 97. When the pump cylinder 4 is rotated by the input shaft 2, high-pressure working oil discharged from the pump chambers 45 accommodating therein the pump plungers 6 in the discharge stroke flows into the oil chambers 71 of the cylinder holes 9 accommodating therein the motor plungers 10 which are in the expansion stroke. Working oil discharged from the oil chambers 71 accommodating therein the motor plungers 10 in the compression stroke flows back into the pump chambers 45 accommodating therein the pump plungers 6 in the suction stroke. During this time, the motor cylinder 8, i.e., the support shaft 11 is rotated by the sum of the reactive torque applied by the pump plungers 6 in the discharge stroke to the motor cylinder 8 through the pump swash plate 32 and the reactive torque received by the motor plungers 10 in the expansion stroke from the motor swash plate 63.

The transmission ratio of the motor cylinder 8 to the pump cylinder 4 is given by the following equation:

$$\text{Transmission ratio} = \frac{\text{Rotational speed of pump cylinder 4}}{\text{Rotational speed of motor cylinder 8}} = \frac{1}{1 + \frac{\text{Displacement of hydraulic motor } M}{\text{Displacement of hydraulic pump } P}}$$

It can be understood from the above equation that the transmission ratio can be varied from 1 to a desired value by varying the displacement of the hydraulic motor M that is determined by the stroke of the motor plungers 10, from zero to a certain value.

The motor cylinder 8 comprises axially separate first through fourth members or segments 8a through 8d. The first member 8a includes the support shaft 11 as a unitary element, and accommodates the pump swash plate 32 therein. The cylinder holes 9 are defined in the second, third, and fourth members 8b through 8d. The third member 8c serves as the distribution member 46. The fourth member 8d has the support shaft 12 as a unitary element.

The first and second members 8a, 8b are coupled to each other by means of a plurality of bolts 98. The second, third, and fourth members 8b, 8c, 8d are relatively positioned by knock pins 99, 100 fitted in positioning holes defined in their mating end faces, and are firmly coupled together by means of a plurality of bolts 101.

The input shaft 2 has an inner end portion rotatably supported centrally in the distribution member 46 by a needle bearing 105. The pump cylinders 4 are resiliently held against the distribution member 46 by the spring 37.

A support plate 107 is fixed to an outer end surface of the case member 1b by means of bolts 106. To the support plate 107, there is securely coupled a cylindrical fixed shaft 108 projecting into the support shaft 12 of the motor cylinder 8. The distribution ring 97 slidably held against the distribution member 46 is eccentrically supported on the inner end of the fixed shaft 108. The distribution ring 97 divides an interior space 109 in the fourth member 8d of the motor cylinder 8 into an inner chamber 110 and an outer chamber 111. The distribution member 46 has an outlet port 112 and an inlet port 113. The outlet port 112 provides fluid communication between the pump chambers 45 that receive the pump plungers 6 operating in the discharge stroke and the inner chamber 110. The inlet port 113 provides fluid communication between the pump chambers 45 that receive the pump plungers 6 operating in the suction stroke and the outer chamber 111. The distribution member 46 also has a number of communication ports 114 defined therein and through which the oil chambers 71 of the motor cylinder 8 communicate with the inner chamber 110 or the outer chamber 111.

Therefore, upon rotation of the pump cylinder 4, high-pressure working oil discharged by the pump plungers 6 in the discharge stroke flows from the outlet port 112, the inner chamber 110, and those communication ports 114 which communicate with the inner chamber 110 into the oil chambers 71 receiving the motor plungers 10 which are in the expansion stroke, thereby imposing a thrust on these motor plungers 10. Working oil discharged by the motor plungers 10 operating in the compression stroke flows through those communication ports 114 which communicate with the outer chamber 111 and the inlet port 113 into the pump chambers 45 receiving the pump plungers 6 in the suction stroke. Upon such circulation of the working oil, hydraulic power can be transmitted from the hydraulic pump P to the hydraulic motor M as described above.

The fixed shaft 108 has a peripheral wall having two, for example, radial bypass ports 115 through which the inner and outer chambers 110, 111 communicate with each other. A cylindrical clutch valve 116 is rotatably fitted in the fixed shaft 108 for selectively opening and closing the ports 115. The clutch valve 116 has valve holes 117 defined in its peripheral wall near the distal end thereof, and a control connector 119 on the opposite end to which a control shaft 118 coupled to a clutch control device (not shown) is connected. The clutch valve 116 serves as a clutch for selectively connecting and disconnecting the hydraulic pump P and the hydraulic motor M.

When the clutch valve 116 is rotated about its own axis to fully open the valve holes 117 in full registry with the bypass ports 115, the clutch is in an "OFF" position. When the bypass ports 115 are fully closed by shifting the valve holes 117 out of registry therewith, the clutch is in an "ON" position. When the bypass ports 115 are partly opened by slightly shifting the valve holes 117, the clutch is in a "partly ON" position. With the clutch OFF as shown, working oil discharged from the outlet port 112 into the inner chamber 110 flows through the bypass ports 115 and the outer chamber 111 directly into the inlet port 113, making the hydraulic motor M inoperative. When the clutch is ON, the above oil flow is shut off, and working oil is circulated from the hydraulic pump P to the hydraulic motor M, allowing hydraulic power to be transmitted from the hydraulic pump P to the hydraulic motor M.

The clutch valve 116 houses therein a hydraulic servomotor 121 actuatable by a pilot valve 120. The servomotor 121 has a servo piston 122 including a valve rod 123 which is of a diameter smaller than the inside diameter of the clutch valve 116. The valve rod 123 projects into the inner chamber 110 and has a distal end on which a closure valve 124 is pivotally mounted for closing the outlet port 112. When the servo piston 122 is moved to the left until the closure valve 124 is held closely against the distribution member 46, the outlet port 112 is closed. The outlet port 112 is closed when the motor swash plate 73 is vertically positioned (as viewed in FIG. 1) for the transmission ratio of 1. With the outlet port 112 closed, the pump plungers 6 are hydraulically locked to cause the pump cylinder 4 to mechanically drive the motor cylinder 8 through the pump plungers 6 and the pump swash plate 32. As a result, the thrust of the motor plungers 10 on the motor swash plate 63 is eliminated, and so is the load on the various bearings.

The fixed shaft 108 and the support plate 107 have an oil passage 139 communicating with the inner chamber 110 and an oil passage 140 communicating with the outer chamber 111. The support plate 107 has an oil passage 141 communicating with the oil passage 90 connected to the servomotor 81. A changeover valve 142 is disposed in the support plate 107 for selectively communicating the oil passages 139, 140 with the oil passage 141. The changeover operates to communicate one of the oil passages 139, 140 which is of a higher oil pressure, with the oil passage 141. Therefore, the servomotor 81 for tilting the motor swash plate 63 of the hydraulic motor M is supplied with the higher oil pressure from the inner chamber 110 or the outer chamber 111.

The pilot valves 88, 120 of the respective servomotors 81, 121 are coupled to ends of links 127, 128, respectively. The other end of the link 127 is coupled to a rotatable shaft 129 which can be rotated about its own axis by an actuator (not shown), the shaft 129 having a cam 130 supported thereon. The other end of the link 128 supports thereon a cam follower 131 slidingly contacting the cam 130. When the servomotor 81 is operated to vertically position the motor swash plate 63, the servomotor 121 is operated by the link 127, the cam 130, the cam follower 131, and the link 128 to enable the closure valve 124 to close the outlet port 112.

A replenishing pump F is mounted on an outer surface of the end wall of the case member 1a. The replenishing pump F is driven by the input shaft 2 for feeding, under a constant pressure, working oil from the oil tank (not shown) on the bottom of the transmission case 1. The replenishing pump F has an outlet port 136 communicating through an axial central oil passage 137 defined in the input shaft 2 with the inner chamber 110 via a check valve 138 and also with the outer chamber 111 via another check valve (not shown). The replenishing pump F therefore supplies oil to automatically compensate for any oil leakage from the closed hydraulic circuit composed of the hydraulic pump P and the hyraulic motor M.

In the closed hydraulic circuit including the hydraulic pump P and the hyraulic motor M, the oil passage 139 defined on the discharge side of the hydraulic pump P, i.e., connected to the inner chamber 110, is coupled to one end of an oil passage 150, and the oil passage 140 defined on the suction side of the hydraulic pump P, i.e., connected to the outer chamber 111, is coupled to one end of an oil passage 151. The other ends of the oil passages 150, 151 are coupled respectively to input ports 153, 154 of a shuttle valve 152.

The shuttle valve 152 is selectively switchable between three positions, i.e, an intermediate position in which fluid communication between the input ports 153, 154 and an output port 155 thereof is cut off, a lower-end position in which the input port 153 communicates with the output port 155, and an upper-end position in which the input port 154 communicates with the output port 155. The oil pressure from the oil passage 150 is applied to shift the shuttle valve 152 into the upper-end position, and the oil pressure from the oil passage 151 is applied to shift the shuttle valve 152 into the lower-end position. Thus, if the differential pressure between the oil passages 150, 151 is large, the shuttle valve 152 is shifted to the lower-end position or the upper-end position so that the oil passage 150 or 151 which is of lower oil pressure will communicate with the output port 155.

The output port 155 of the shuttle valve 152 is coupled to an oil passage 157 having a relief valve 156 which is opened when the oil pressure in the output port 155 becomes higher than a preset level and also having a check valve 158 disposed downstream of the relief valve 156 in the direction in which oil flows in the oil passage 157. The third discharge passage 51 communicating with the chamber 31 is coupled to an oil passage 160 having a check valve 159. The oil passages 157, 160 are connected to a common oil cooling unit 161 which is coupled to an oil tank 162 that may be disposed on the bottom of the transmission case 1 or outside of the transmission case 1.

The flow of oil which has absorbed generated heat will be described below. In the hydraulic pump P, the sliding surfaces of the pump plungers 6 and the cylinder holes 5, the sliding surfaces of the pump cylinder 4 and the distribution member 46, and the sliding surfaces of the pump swash plate 32 and the pump shoe 33 generate heat. Oil which has absorbed such heat generated by these sliding surfaces flows from the chamber 31 through the first discharge passage 48, the second discharge passage 49, the pressure control valve 50, the third discharge passage 51, the oil passage 160, and the cooling unit 161 into the oil tank 162. Oil which has absorbed heat generated by the sliding surfaces of the distribution ring 97 and the distribution member 46 flows from the inner chamber 110 or the outer chamber 111 through the shuttle valve 152, the relief valve 156, the oil passage 157, and the cooling unit 161 into the oil tank 162.

The cooling unit 161 may comprise a general heat exchanger which is water- or air-cooled. The cooling unit 161 has a capacity which is large enough to dissipate the amount of heat (Ql+ql) or (Qh+qh), whichever is higher, where Ql is the amount of heat to be dissipated that flows from the chamber 31 when the output rotational speed is low, ql is the amount of heat to be dissipated that flows from the closed hydraulic circuit when the output rotational speed is low, Qh is the amount of heat to be dissipated that flows from the chamber 31 when the output rotational speed is high, and qh is the amount of heat to be dissipated that flows from the closed hydraulic circuit when the output rotational speed is high.

Operation of the above embodiment is as follows:
The amount of heat generated by the sliding surfaces in the hydraulic pump P is greater as the differential speed of rotation between the pump cylinder 4 and the motor cylinder 8 is greater, i.e., the transmission ratio is higher, and the output rotational speed is lower. The amount of heat generated by the sliding surfaces of the distribution ring 97 and the distribution member 46 is higher as the rotational speed of the motor cylinder 8 is higher, i.e., the output rotational speed is higher. Therefore, the cooling unit 161 is effectively utilized when the output rotational speed is lower and higher.

When the output rotational speed is higher and during acceleration, the inner chamber 110 is of higher pressure, and during deceleration, the outer chamber 111 is of higher pressure. No matter which chamber 110 or 111 is of higher pressure, oil is fed from the lower pressure side in the closed hydraulic circuit by the shuttle valve 152 to the cooling unit 161, with the result that the transmission efficiency will not be lowered.

Since the oil passages coupled to the chamber 31 and the oil passages coupled to the closed hydraulic circuit are connected to the common cooling unit 161, the cooling unit 161 is of a small size and can efficiently cool the oil supplied thereto.

Figure 4:
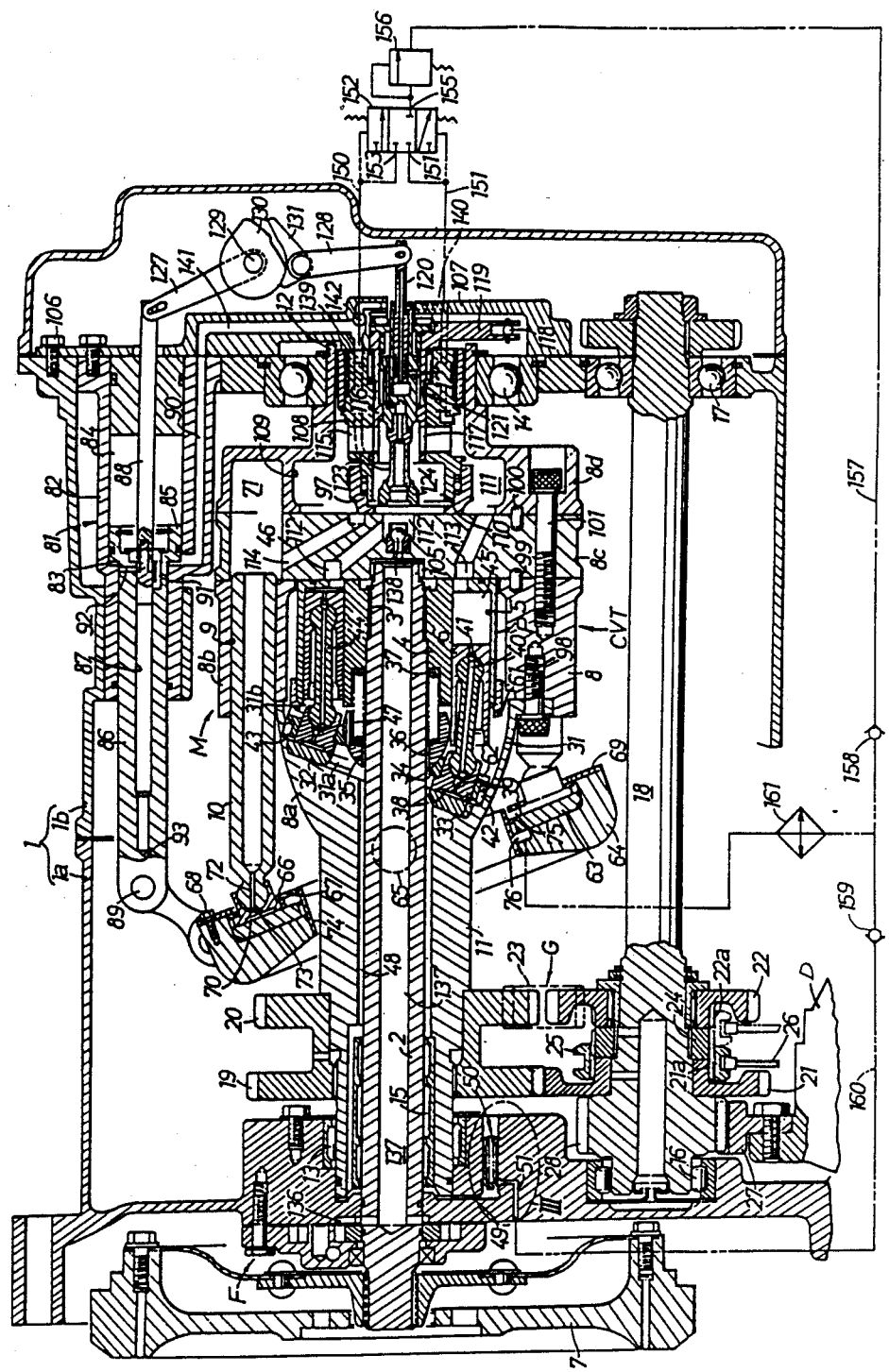
FIG. 4 is a longitudinal cross-sectional view of an automotive hydraulically operated, continuously variable transmission according to another embodiment of the present invention.

FIG. 4 shows an automotive hydraulically operated, continuously variable transmission according to another embodiment of the present invention. This embodiment differs from the preceding embodiment in that the motor swash plate 63 of the swash plate holder 64 in the hydraulic motor M has a recess 76 defined in its inner peripheral edge and communicating with the lubricating chamber 75, and oil which has been cooled by the cooling unit 161 is supplied to the recess 76. With this arrangement, in addition to the advantages offered by the preceding embodiment, the sliding surfaces of the motor swash plate 63 and the motor shoes 66 can be cooled by the oil without requiring a special pump.

Figure 5:
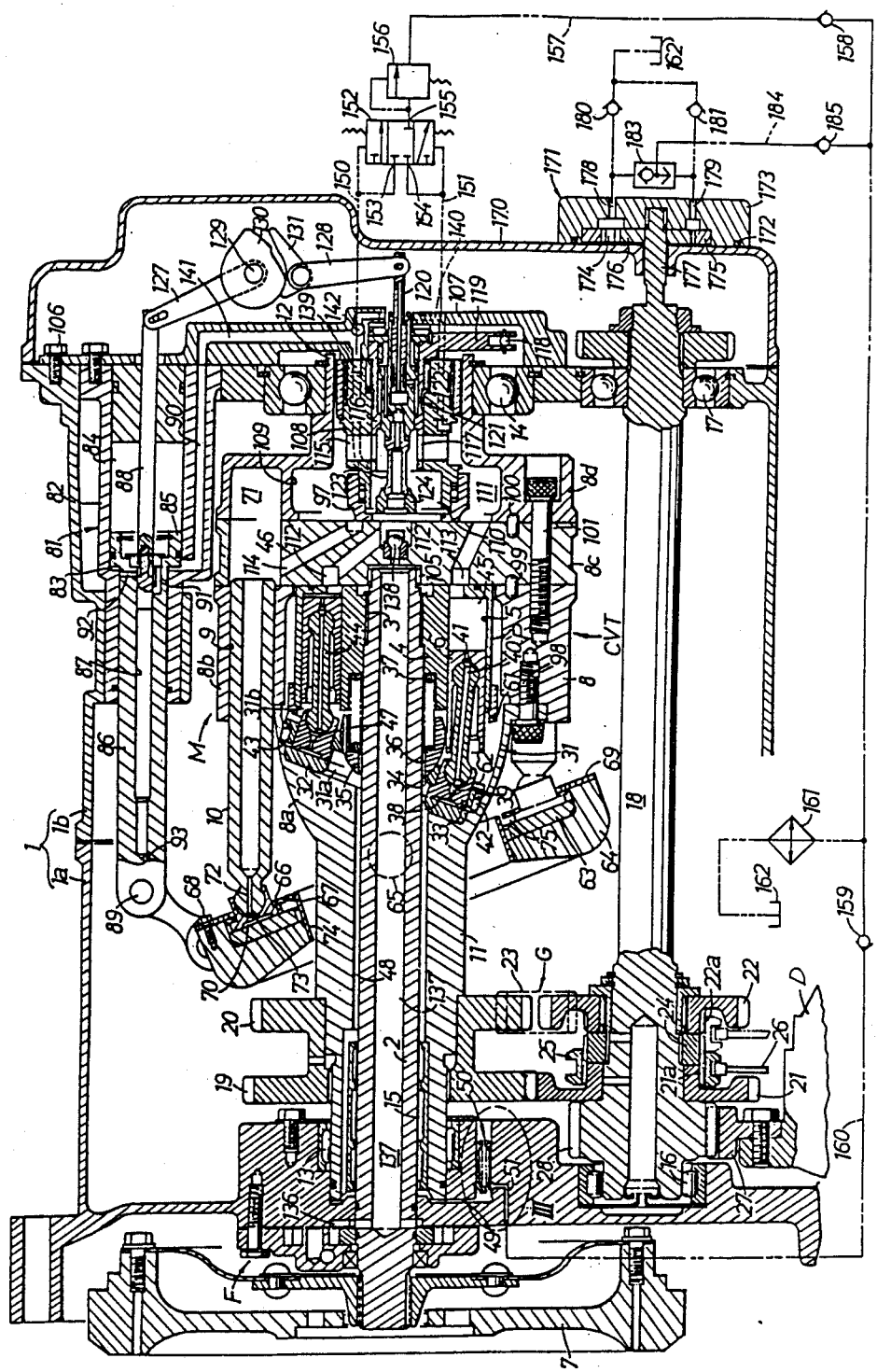
FIG. 5 is a longitudinal cross-sectional view of an automotive hydraulically operated, continuously variable transmission according to still another embodiment of the present invention.

According to still another embodiment shown in FIG. 5, a supply pump 171 is added to the embodiment of FIG. 1 for supplying oil from the oil tank 162 to the cooling unit 161.

More specifically, a cover 170 is attached to the end wall of the case member 1b in covering relation to the support plate 107, the links 127, 128, the cam 130, and the cam follower 131, and the supply pump 171 which is operatively coupled to the hydraulic motor M is mounted on the cover 170.

The supply pump 171 may comprise a trochoid pump, for example. The supply pump 171 has a pump chamber 174 defined between the cover 170 and a housing 173 attached to the outer surface of the cover 172 with a seal member 170 therebetween, an internal gear 175 rotatably disposed in the pump chamber 174 and held in slidable contact with an inner surface of the pump chamber 174, and an external gear 176 rotatably disposed in the pump chamber 174 and meshing with the internal gear 176 in eccentric relation thereto. The auxiliary shaft 18 has an end projecting out from the end wall of the case member 1b and having an integral shaft 177 rotatably extending through the cover 170 in a fluid-tight manner, the external gear 176 being fixedly mounted on the shaft 177. The housing 173 has two ports 178, 179 communicating with the pump chamber 174.

The auxiliary shaft 18 rotates in opposite directions when the motor vehicle is moved forward and backward. Therefore, when one of the ports 178, 179 operates as an inlet port, the other port operates as an outlet port.

The ports 178, 179 are coupled to the oil tank 162 through respective check valves 180, 181 which prevent oil from flowing from the ports 178, 179 to the oil tank 162.

The passage between the port 178 and the check valve 180 and the passage between the port 179 and the check valve 181 are connected to an oil passage 184 through a shuttle valve 183. The shuttle valve 183 is operated to communicate the port 178 or 179, whichever is of higher oil pressure, with the oil passage 184, so that oil discharged from the supply pump 171 is led to the oil passage 184.

The oil passage 184 has a check valve 185, which is connected to the cooling unit 161 through the oil passage 157.

According to this embodiment, when the output rotational speed is high, the supply pump 171 which rotates at a speed in proportion to the output rotational speed feeds oil the oil tank 162 to the cooling unit 161. This arrangement is effective when $(Ql+ql)$ is much greater than $(Qh+qh)$, and can prevent the temperature of oil in the oil tank 162 from rising due to the heat generated by the sliding surfaces in the hydraulic pump P and the other sliding surfaces than those of the distribution member 46 and the distribution ring 97.

Although certain preferred embodiments have been shown and described, it should be understood that many changes and modifications may be made therein without departing from the scope of the appended claims.

What is claimed is:

1. A hydraulically operated continuously variable transmission comprising:
   an output shaft;
   a hydraulic motor coupled to said output shaft and having a motor swash plate and a motor cylinder supporting an annular array of slidable motor plungers held in slidable contact with said motor swash plate, said motor cylinder having a distribution member;
   an input shaft;
   a hydraulic pump coupled to said input shaft and having a pump swash plate and a pump cylinder held slidably against said distribution member and supporting an annular array of slidable pump plungers held in slidable contact with said pump swash plate, said pump cylinder and sid motor cylinder communicating with each other through said distribution member;
   a closed hydraulic circuit interconnecting said hydraulic pump and said hydraulic motor;
   a distribution ring held slidably against said distribution member and dividing said closed hydraulic circuit into lower- and higher-pressure sides;
   an oil chamber defined between said pump cylinder and said motor cylinder;
   first oil passage means connecting with said oil chamber;
   second oil passage means communicating with said closed hydraulic circuit and having means for selectively conducting oil directly from said closed hydraulic circuit; and
   a common oil cooling unit to which said first and second oil passage means are connected for receiving oil from said first and second oil passage means.

2. A hydraulically operated continuously variable transmission comprising:
   an output shaft;
   a hydraulic motor coupled to said output shaft and having a motor swash plate and a motor cylinder supporting an annular array of slidable motor plungers held in slidable contact with said motor swash plate, said motor cylinder having a distribution member;

an input shaft;

a hydraulic pump coupled to said input shaft and having a pump swash plate and a pump cylinder held slidably against said distribution member and supporting an annular array of slidable pump plungers held in slidable contact with said pump swash plate, said pump cylinder and said motor cylinder communicating with each other through said distribution member;

a closed hydraulic circuit interconnecting said hydraulic pump and said hydraulic motor;

a distribution ring held slidably against said distribution member and dividing said closed hydraulic circuit into lower- and higher-pressure sides;

an oil chamber defined between said pump cylinder and said motor cylinder;

first oil passage means communicating with said oil chamber;

second oil passage means communicating with said closed hydraulic circuit;

a common oil cooling unit to which said first and second oil passage means are connected; and wherein said first oil passage means includes a pressure control valve for releasing oil from said oil chamber to said oil cooling unit when the pressure of oil in said oil chamber exceeds a prescribed level.

3. A hydraulically operated continuously variable transmission comprising:

an output shaft;

a hydraulic motor coupled to said output shaft and having a motor swash plate and a motor cylinder supporting an annular array of slidable motor plungers held in slidable contact with said motor swash plate, said motor cylinder having a distribution member;

an input shaft;

a hydraulic pump coupled to said input shaft and having a pump swash plate and a pump cylinder held slidably against said distribution member and supporting an annular array of slidable pump plungers held in slidable contact with said pump swash plate, said pump cylinder and said motor cylinder communicating with each other through said distribution member;

a closed hydraulic circuit interconnecting said hydraulic pump and said hydraulic motor;

a distribution ring held slidably against said distribution member and dividing said closed hydraulic circuit into lower- and higher-pressure sides;

an oil chamber defined between said pump cylinder and said motor cylinder;

first oil passage means communicating with said oil chamber;

second oil passage means communicating with said closed hydraulic circuit;

a common oil cooling unit to which said first and second oil passage means are connected; and wherein said second oil passage means includes a shuttle valve having two input ports connected respectively to said lower- and higher-pressure sides of said closed hydraulic circuit and an output port connected to said oil cooling unit, said shuttle valve being movable to bring one of said input ports coupled to said lower-pressure side into communication with said output port.

4. A hydraulically operated continuously variable transmission according to claim 1, further including an oil tank to which said oil cooling unit is connected.

5. A hydraulically operated continuously variable transmission comprising:

an output shaft;

a hydraulic motor coupled to said output shaft and having a motor swash plate and a motor cylinder supporting an annular array of slidably motor plungers held in slidable contact with said motor swash plate, said motor cylinder having a distribution member;

an input shaft;

a hydraulic pump coupled to said input shaft and having a pump swash plate and a pump cylinder held slidably against said distribution member and a supporting an annular array of slidable pump plungers held in slidable contact with said pump swash plate, said pump cylinder and said motor cylinder communicating with each other through said distribution member;

a closed hydraulic circuit interconnecting said hydraulic pump and said hydraulic motor;

a distribution ring held slidably against said distribution member and dividing said closed hydraulic circuit into lower and higher-pressure sides;

an oil chamber defined between said pump cylinder and said motor cylinder;

first oil passage means communicating with said oil chamber;

second oil passage means communicating with said closed hydraulic circuit; and a common oil cooling unit to which said first and second oil passage means are connected;

wherein said motor swash plate has a recess connected to said oil cooling unit for supplying cooled oil to a surface of said motor swash plate which is held in slidable contact with said motor plungers.

6. A hydraulically operated continuously variable transmission comprising:

an output shaft;

a hydraulic motor coupled to said output shaft and having a motor swash plate and a motor cylinder supporting an annular array of slidable motor plungers held in slidable contact with said motor swash plate, said motor cylinder having a distribution member;

an input shaft;

a hydraulic pump coupled to said input shaft and having a pump swash plate and a pump cylinder held slidably against said distribution member and a supporting an annular array of slidable pump plungers held in slidable contact with said pump swash plate, said pump cylinder and said motor cylinder communicating with each other through said distribution member;

a closed hydraulic circuit interconnecting said hydraulic pump and said hydraulic motor;

a distribution ring held slidably against said distribution member and dividing said closed hydraulic circuit into lower and higher-pressure sides;

an oil chamber defined between said pump cylinder and said motor cylinder;

first oil passage means communicating with said oil chamber;

second oil passage means communicating with said closed hydraulic circuit;

a common oil cooling unit to which said first and second oil passage means are connected; and an oil tank and supply pump operatively coupled to said hydraulic motor and said oil tank for supplying oil from said oil tank to said oil passage means.

7. A hydraulically operated continuously variable transmission according to claim 6, wherein said supply pump comprises a trochoid pump.

8. A hydraulically operated continuously variable transmission including:
   a hydraulic motor having a motor cylinder;
   a hydraulic pump having a pump cylinder;
   a closed hydraulic circuit interconnecting said hydraulic pump and said hydraulic motor;
   an oil chamber defined between said pump cylinder and said motor cylinder;
   first oil passage means communicating with said oil chamber;
   second oil passage means communicating with said closed hydraulic circuit and having means for selectively conducting oil directly from said closed hydraulic circuit; and
   a common oil cooling unit to which said first and second oil passage means are connected for receiving oil from said first and second oil passage means.

9. A hydraulically operated, continuously variable transmission including:
   a hydraulic motor having a motor cylinder;
   a hydraulic pump having a pump cylinder;
   a closed hydraulic circuit interconnecting said hydraulic pump and said hydraulic motor;
   an oil chamber defined between said pump cylinder and said motor cylinder;
   first oil passage means communicating with said oil chamber;
   second oil passage means communicating with said closed hydraulic circuit;
   a common oil cooling unit to which said first and second oil passage means are connected; and
   means for selectively feeding oil from one of said first and second oil passage means to said cooling unit, said means for selectively feeding oil responding to a differential pressure between said first and second oil passage means.

10. The hydraulically operated, continuously variable transmission of claim 9, wherein said means for selectively feeding oil comprises a shuttle valve operatively connected to said first oil passage means, said second oil passage means, and said oil cooler.

11. The hydraulically operated, continuously variable transmission of claim 9, further comprising means for selectively restricting the flow of oil to said oil cooler when oil being fed from said means for selectively feeding oil is below a certain predetermined pressure.

12. The hydraulically operated, continuously variable transmission of claim 11, wherein said means for selectively restricting the flow of oil comprises a relief valve.

* * * * *